United States Patent
Lee (10) Patent No.: US 10,523,417 B2
(45) Date of Patent: Dec. 31, 2019

(54) APPARATUS FOR ENCRYPTION AND SEARCH AND METHOD THEREOF

(71) Applicants: Samsung Electronics Co., Ltd., Suwon-si, Gyeonggi-do (KR); KOREA UNIVERSITY RESEARCH AND BUSINESS FOUNDATION, Seoul (KR)

(72) Inventor: Dong-Hoon Lee, Seoul (KR)

(73) Assignees: Samsung Electronics Co., Ltd., Suwon-si (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 245 days.

(21) Appl. No.: 15/468,931

(22) Filed: Mar. 24, 2017

(65) Prior Publication Data

US 2017/0279605 A1    Sep. 28, 2017

(30) Foreign Application Priority Data

Mar. 25, 2016    (KR) .................. 10-2016-0035697

(51) Int. Cl.
```
H04L 9/00      (2006.01)
H04L 9/14      (2006.01)
G06F 21/62     (2013.01)
```

(52) U.S. Cl.
CPC ............ H04L 9/00 (2013.01); G06F 21/6227 (2013.01); H04L 9/14 (2013.01)

(58) Field of Classification Search
CPC ....................................................... H04L 9/00
See application file for complete search history.

(56) References Cited

U.S. PATENT DOCUMENTS 8,930,691 B2 * 1/2015 Kamara .............. G06F 21/6218
                                                        713/165
9,342,705 B1 * 5/2016 Schneider ................. H04L 9/14
(Continued)

FOREIGN PATENT DOCUMENTS

KR          10-1398216 B1        5/2014

OTHER PUBLICATIONS

Merkle; Secure communications over insecure channels; Published in: Magazine Communications of the ACM CACM Homepage archive vol. 21 Issue 4, Apr. 1978; pp. 294-299; ACM Digital Library (Year: 1978).*

(Continued)

*Primary Examiner* — Bradley W Holder
(74) *Attorney, Agent, or Firm* — Jefferson IP Law, LLP (57) ABSTRACT

The present disclosure relates to a sensor network, machine type communication (MTC), machine-to-machine (M2M) communication, and technology for internet of things (IoT). The present disclosure may be applied to intelligent services based on the above technologies, such as smart home, smart building, smart city, smart car, connected car, health care, digital education, smart retail, security and safety services. A method for performing an encryption process is provided. The method includes generating a plurality of keys used for keyword encryption and file encryption, generating an address ciphertext by performing a first encryption process on each of addresses that a plurality of files are stored, generating a keyword ciphertext by performing a second encryption process on each of a plurality of keywords that are included in each of the plurality of files, reordering the address ciphertext and the keyword ciphertext based on the keyword ciphertext, and storing the reordered address ciphertext and keyword ciphertext.

12 Claims, 8 Drawing Sheets

(56) References Cited

U.S. PATENT DOCUMENTS

| | | | | |
|---|---|---|---|---|
| 9,679,160 B1* | 6/2017 | Zhang | ............... | H04L 9/14 |
| 9,769,664 B1* | 9/2017 | Kavaler | ............ | H04W 12/06 |
| 2004/0076296 A1* | 4/2004 | Terauchi | ............ | H04N 5/913 |
| | | | | 380/201 |
| 2009/0300351 A1* | 12/2009 | Lei | ............... | H04L 9/0894 |
| | | | | 713/165 |
| 2010/0169321 A1* | 7/2010 | Wang | ............ | G06F 16/316 |
| | | | | 707/741 |
| 2013/0046974 A1* | 2/2013 | Kamara | ............ | H04L 9/00 |
| | | | | 713/165 |
| 2014/0223010 A1* | 8/2014 | Hayner | ............ | H04L 47/783 |
| | | | | 709/226 |
| 2015/0156011 A1* | 6/2015 | Kamara | ............ | H04L 9/00 |
| | | | | 713/165 |

OTHER PUBLICATIONS

Kartalopoulos; A primer on cryptography in communications; Published in: IEEE Communications Magazine ( vol. 44 , Issue: 4, Apr. 2006 ); pp. 146-151; Date of Publication: May 15, 2006; IEEE Xplore (Year: 2006).*

* cited by examiner

APPARATUS FOR ENCRYPTION AND SEARCH AND METHOD THEREOF

CROSS-REFERENCE TO RELATED APPLICATION(S)

This application claims the benefit under 35 U.S.C. § 119(a) of a Korean patent application filed on Mar. 25, 2016 in the Korean Intellectual Property Office and assigned Serial number 10-2016-0035697, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) KOREA UNIVERSITY RESEARCH AND BUSINESS FOUNDATION.

TECHNICAL FIELD

The present disclosure relates to an apparatus for encryption and search and method thereof. More particularly, the present disclosure relates to an apparatus for encryption and search considering binary search and method thereof.

BACKGROUND

The internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

A cloud storage service is a service in which a user device may have a storage of the user device at an internet. In the cloud storage service, the user device may access a cloud storage server in an environment in which an internet is possible to download a file of the user device which is stored at the cloud storage server, to upload the file of the user device to the cloud storage server, or to use a file stored at the cloud storage server (for example, streaming, editing, and/or the like).

Recently, various cloud storage services have been proposed, and typical examples are Dropbox©, One Drive©, Google Photos©, Amazon Photos©, N Drive©, and the like.

Recently, various cloud storage services have been activated. Specially, a major service provider such as Google Photos©, Amazon Photos©, and the like provides aggressively a cloud storage service. For example, Google Photos© provides a unlimited storage for storing pictures, and Amazon Photos© provides a unlimited storage for storing pictures to prime members.

Meanwhile, technical barriers to a cloud storage service become low, so many start-up companies which provide a cloud storage service have been founded. Specially, Amazon web services (AWS)© provided by Amazon© provides an infrastructure and a framework for which implementation and an operation may be relatively easy. Specially, in a case that AWS© is used, users which have less experience for implementing and operating a server may be relatively easy to implement and operate a server. So, many start-up companies have provided various services which use a cloud storage service.

A cloud storage service is actively applied to various environments. However, it is difficult for a user device to trust a cloud storage service provider, so the user device needs to encrypt data, e.g., a file sensitive to security in advance and upload the encrypted file to a cloud storage server.

In a case that a user device encrypts data to upload the encrypted data to a cloud storage server, the cloud storage server may not access the encrypted data uploaded by the user device without using a secret key of the user device. So, security for data is surely guaranteed, but it is impossible to use existing search processes.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus for encryption and search considering binary search and method thereof.

Another aspect of the present disclosure is to provide an apparatus for encryption and search considering binary search which may be applied even if a database (DB) is changed, and method thereof.

Another aspect of the present disclosure is to provide an apparatus for encryption and search considering binary search which may add and delete a keyword, and method thereof.

Another aspect of the present disclosure is to provide an apparatus for encryption and search considering binary search in which a length of a keyword may be unlimited, and method thereof.

In accordance with an aspect of the present disclosure, a method for performing an encryption process is provided. The method includes generating a plurality of keys used for keyword encryption and file encryption, generating an address ciphertext by performing a first encryption process on each of addresses that a plurality of files are stored, generating a keyword ciphertext by performing a second encryption process on each of a plurality of keywords that are included in each of the plurality of files, reordering the address ciphertext and the keyword ciphertext based on the keyword ciphertext, and storing the reordered address ciphertext and keyword ciphertext.

In accordance with another aspect of the present disclosure, a method for performing a search process is provided. The method includes receiving a keyword from a user device, generating a keyword ciphertext by performing a first encryption process on the keyword, and searching a file ciphertext that corresponds to the keyword ciphertext identical to a stored keyword ciphertext that is stored in a database (DB) that an address ciphertext for each of addresses that a plurality of files is stored, a keyword ciphertext for each of a plurality of keywords included in each of the plurality of files, and the file ciphertext for each of the plurality of files is stored.

In accordance with another aspect of the present disclosure, an apparatus for performing an encryption process is provided. The apparatus includes at least one processor configured to generate a plurality of keys used for keyword encryption and file encryption, generate an address ciphertext by performing a first encryption process on each of addresses that a plurality of files are stored, generate a keyword ciphertext by performing a second encryption process on each of a plurality of keywords that are included in each of the plurality of files, reorder the address ciphertext and the keyword ciphertext based on the keyword ciphertext, and store the reordered address ciphertext and keyword ciphertext.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital versatile disc (DVD) player, an audio, a refrigerator, an air conditioner, a vacuum cleaner, an oven, a microwave oven, a washer, a dryer, an air purifier, a set-top box, a television (TV) box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

An embodiment of the present disclosure proposes an apparatus for encryption and search considering binary search and method thereof.

An embodiment of the present disclosure proposes an apparatus for encryption and search considering binary search which may be applied even if a database (DB) is changed, and method thereof.

An embodiment of the present disclosure proposes an apparatus for encryption and search considering binary search which may add and delete a keyword, and method thereof.

An embodiment of the present disclosure proposes an apparatus for encryption and search considering binary search in which a length of a keyword may be unlimited, and method thereof.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3rd generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol (IP) television (IPTV), a moving picture experts group (MPEG) media transport (MMT) system and/or the like.

Like in a cloud storage service, if a user device encrypts data, e.g., a file in advance and uploads the encrypted file to a server, the server may not access the encrypted file which is uploaded by the user device. So, security for the data is surely guaranteed, however, it is impossible to use existing search processes.

For solving this issue, study for a searchable encryption process in which existing search processes may be applied to encrypted data has been actively progressed.

The searchable encryption process is a process which may search a ciphertext including a keyword generated by a user device without decoding a whole ciphertext, and this will be described below.

The searchable encryption process includes three processes, i.e., a process for generating an index, a process for generating a search token, and a search process. Here, a process for generating an index will be referred to as "BuildIndex process", and a process for generating a search token will be referred to as "Trapdoor process". Each of the BuildIndex process, the Trapdoor process, and the search process will be described below.

Firstly, the BuildIndex process will be described below.

In the BuildIndex process, a user device inputs a DB for a plaintext $DB=(M_1, \ldots, M_n)$ and a keyword set of a DB $W=w_1, \ldots, w_m$, and generates an index I including information required for ciphertext search based on a secret key K.

Secondly, the Trapdoor process will be described below.

In the Trapdoor process, a user device inputs a predication f which is generated based on a keyword W that the user device intends to search, and generates a search token T based on a secret key K. Here, $T=\text{Trapdoor}_K(f)$.

Thirdly, the search process will be described below.

In the search process, a server inputs a search token T and an index I which are provided from a user device, and generates location information id of a ciphertext including a predication of the search token.

So, the user device uploads an index generated in the BuildIndex and encrypted data to a cloud storage server. The user device transmits the search token generated in the Trapdoor process to the cloud storage server using query, and the cloud storage server performs a search process based on the search token received from the user device and the index uploaded by the user device. After performing the search process, the cloud storage server may detect location information of a ciphertext, detects the ciphertext based on the location information, and transmits the detected ciphertext to the user device.

The BuildIndex process and the search process will be described with reference to FIGS. 1 and 2.

A BuildIndex process in a searchable encryption process according to an embodiment of the present disclosure will be described with reference to FIG. 1.

Figure 1:
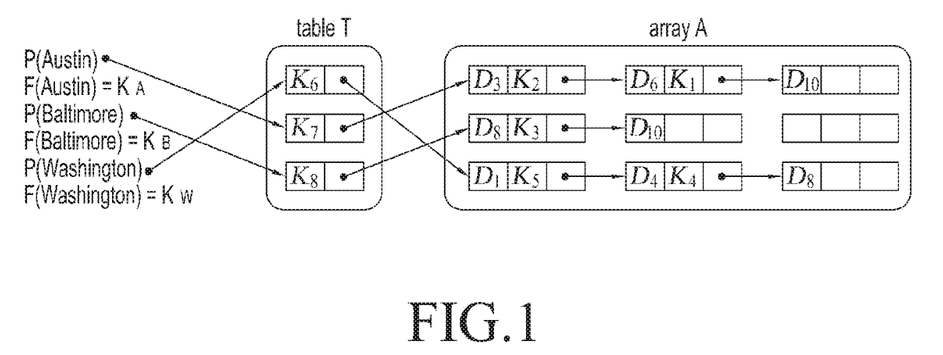
FIG. 1 schematically illustrates a BuildIndex process in a searchable encryption process according to an embodiment of the present disclosure.

FIG. 1 schematically illustrates a BuildIndex process in a searchable encryption process according to an embodiment of the present disclosure.

Referring to FIG. 1, an index includes an array A and a table T. Each of identifiers of ciphertexts including a keyword is encrypted, and the encrypted identifier is stored at the array A as a form of array. The table T stores location and a decryption key $K_i$ of the first node included in the array A.

In the table T, an address value and a decryption key of the first node included in the array A are stored at location that has an address value as a value which is calculated by applying pseudo random permutation (PRP) to a keyword. The array A is configured as a form of linked list which is linked to each keyword, and an identifier Di of a ciphertext, a decryption key of the next node, and an address value of the next node are stored at each node.

For example, a BuildIndex process in a case that three keywords, e.g., "Austin", "Baltimore" and "Washington" are used is illustrated in FIG. 1, a table T stores an address value and a decryption key of the first node included in an array A for each of the three keywords, and the array A stores an identifier Di of a ciphertext, a decryption key of the next node, and an address value of the next node for each of the three keywords.

Referring to FIG. 1, P denotes PRP, and F denotes a pseudo random function (PRF).

A BuildIndex process in a searchable encryption process according to an embodiment of the present disclosure has been described with reference to FIG. 1, and a Trapdoor process in a searchable encryption process according to an embodiment of the present disclosure will be described below.

In the Trapdoor process, Trapdoor becomes a PRP value and a PRF value for a keyword. Upon performing a search operation, a user device detects a PRP value and a PRF value for a keyword which the user device intends to search and transmits the detected PRP value and PRF value to a server.

A Trapdoor process in a searchable encryption process according to an embodiment of the present disclosure has been described above, and a search process in a searchable encryption process according to an embodiment of the present disclosure will be described with reference to FIG. 2.

Figure 2:
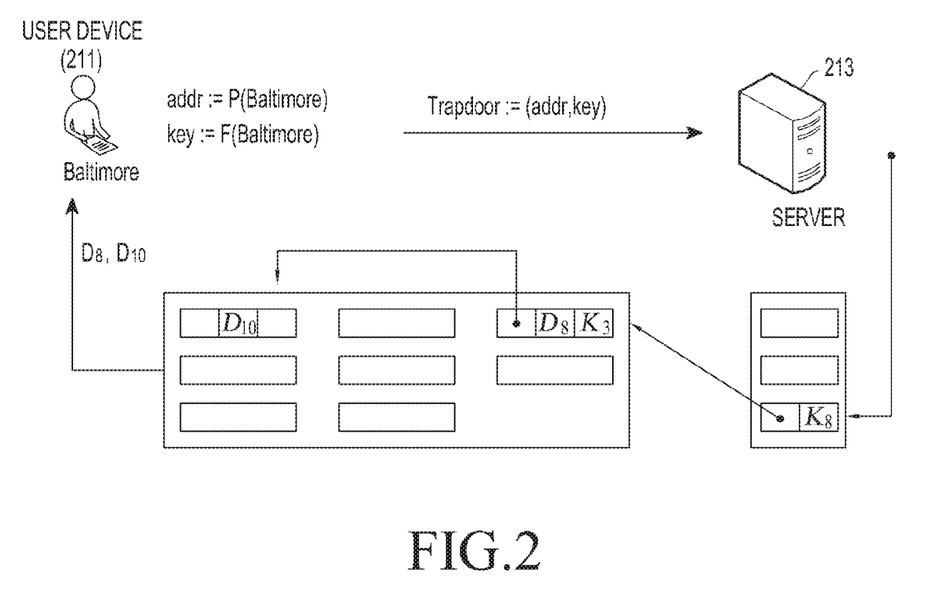
FIG. 2 schematically illustrates a search process in a searchable encryption process according to an embodiment of the present disclosure.

FIG. 2 schematically illustrates a search process in a searchable encryption process according to an embodiment of the present disclosure.

Referring to FIG. 2, a server searches a node has a PRP value in Trapdoor as an address value in a table T, and decrypts the node using a PRF value as a decryption key. A node address value and a decryption key of an array A is stored at the decrypted node. So, if a node which corresponds to the node address value is decrypted based on the decryption key, a ciphertext identifier, an address value of the next node, and a decryption key are stored at the decrypted node.

Like this, the server searches ciphertext identifiers and transmits ciphertexts to a user device until there is no node.

A search process in a case that a user device 211 uses "Baltimore" as a keyword is illustrated in FIG. 2. The user device 211 performs a Trapdoor process based on an address value which corresponds to the keyword "Baltimore", e.g., a PRP value for the keyword "Baltimore", and a decryption key which corresponds to the keyword "Baltimore", e.g., a PRF value for the keyword "Baltimore", and transmits a search token which is generated according to the Trapdoor process to a cloud storage server 213. The cloud storage server 213 performs a search process based on the search token received from the user device 211, and transmits a result according to the search process, i.e., detected ciphertexts to the user device 211.

The searchable encryption process as described above may be applied to a fixed DB. So, upon adding a new ciphertext to a DB or deleting an existing ciphertext from a DB, a user device needs to newly generate an index. That is, the user device needs to perform a BuildIndex process on a DB to which a ciphertext is added or a DB from which a ciphertext is deleted again.

In the searchable encryption process, it is regulated that a length of a keyword is equal to a length of an address value of a node included in a table T, so there is limitation on the length of the keyword.

So, an embodiment of the present disclosure proposes an encryption and search process considering binary search, and this will be described below.

An encryption and search process considering binary search according to an embodiment of the present disclosure includes a key generation process, a key encryption process, a file encryption process, and a search process. Each of the key generation process, the key encryption process, the file encryption process, and the search process will be described below.

Firstly, the key generation process will be described below.

In the key generation process, a user device generates keys used for keyword encryption and file encryption. In a search process, the user device may generate Trapdoor and decrypt a ciphertext based on the keys generated in the key generation process.

Secondly, the key encryption process will be described below.

In a case that a file name, an address that a file is stored, and keywords included in the file are stored at a DB, in the keyword encryption process, a user device generates a new table for the keywords and address, encrypts the keywords by applying a deterministic encryption process, and encrypts the address by applying a probabilistic encryption process. The user device stores a ciphertext for each of the keywords and address at the DB. For example, the user device reorders the ciphertexts for the keywords in ascending order, and stores the reordered ciphertexts at the DB. There may be various schemes for reordering the ciphertexts for the keywords. In an embodiment of the present disclosure, it will be noted that reordering the ciphertexts for the keywords in ascending order is just an example.

Thirdly, the file encryption process will be described below.

An encryption process for a filed stored at a DB is based on an authenticated encryption process for providing integrity and confidentiality at the same time. In the file encryption process, an authenticated cryptogram may become authenticated encryption with associated data (AEAD) that prevents counterfeiting and falsifying data associated with a plaintext and data associated with a ciphertext by packaging the data associated with the plaintext and the data associated with the ciphertext together.

Fourthly, the search process will be described below.

Upon receiving a keyword from a user device, a server, e.g., a cloud storage server performs a search operation in keywords which are reordered by encrypting the received keyword by applying a deterministic encryption process and an address table based on a binary search process.

If there is a stored keyword ciphertext which is identical to a keyword ciphertext, the cloud storage server detects an address of a file by decrypting an address ciphertext and transmits a ciphertext of a file which is stored at the detected address to the user device.

Further, each of the key generation process, the key encryption process, the file encryption process, and the search process will be described below.

Firstly, in the key generation process, a user device generates Key 1 as a cipher-based message authentication code (CMAC) key, and Key 2, Key 3, and Key 4 as advanced encryption standard (AES) keys.

Secondly, a keyword encryption process in an encryption and search process considering binary search according to an embodiment of the present disclosure will be described with reference to FIG. 3.

Figure 3:
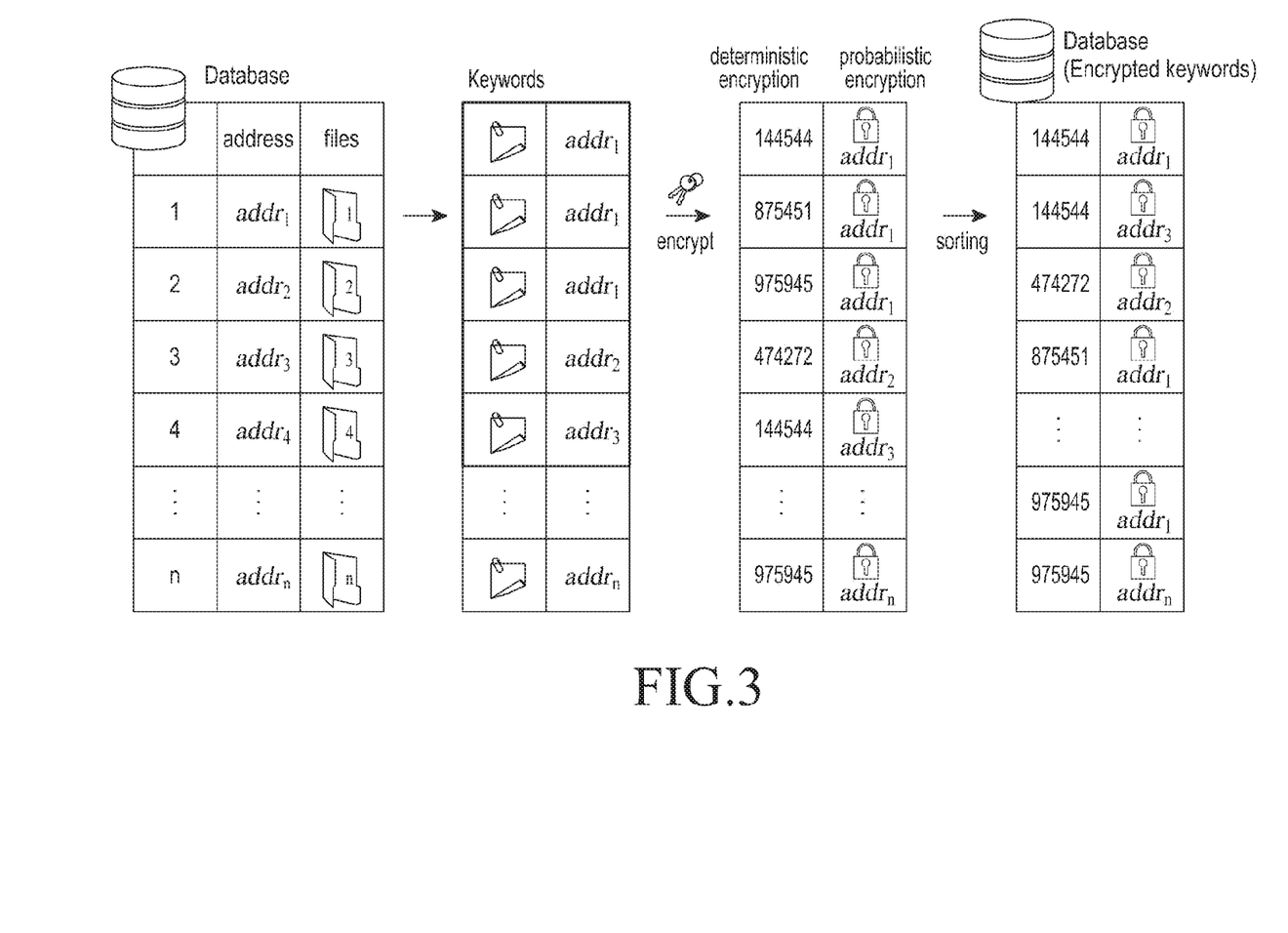
FIG. 3 schematically illustrates a keyword encryption process in an encryption and search process considering binary search according to an embodiment of the present disclosure.

FIG. 3 schematically illustrates a keyword encryption process in an encryption and search process considering binary search according to an embodiment of the present disclosure.

In the keyword encryption process, a user device generates a new table for a keyword and an address value from an address value of a file stored at a DB, the file, and keywords included in the file. The user device encrypts a keyword by applying a deterministic encryption process, and encrypts an address by applying a probabilistic encryption process. For example, the user device reorders the generated keyword ciphertexts in ascending order to store the ordered keyword ciphertexts at a new DB. Here, there may be various schemes for reordering the ciphertexts for the keywords. In an embodiment of the present disclosure, it will be noted that reordering the ciphertexts for the keywords in ascending order is just an example.

For example, a keyword encryption process in a case that there are n files, e.g., a file 1 to a file n at a DB is illustrated in FIG. 3, and addresses of the file 1 to the file n are an address 1 (addr$_1$) to an address n (addr$_n$), respectively. Further, a keyword encryption process in a case that there are three keywords for a file 1, there is one keyword for a file 2, there is one keyword for a file 3, . . . , there is one keyword for a file n is illustrated in FIG. 3.

For the file 1 to the file n, a user device encrypts a keyword by applying a deterministic encryption process and encrypts an address by applying a probabilistic encryption process, so three keyword ciphertexts for the file 1 are 144544, 875451, and 975945, one keyword ciphertext for the file 2 is 474272, one keyword ciphertext for the file 3 is 144544, . . . , in this way, one keyword ciphertext for the file n as the last file is 975945.

The user device reorders the generated keyword ciphertexts in ascending order to store the reordered keyword ciphertexts at a new DB, so a keyword ciphertext 144544 and an address 1 are stored at the first node in the DB, a keyword ciphertext 144544 and an address 3 are stored at the second node in the DB, a keyword ciphertext 474272 and an address 2 are stored at the third node in the DB, a keyword ciphertext 875451 and an address 1 are stored at the fourth node in the DB, . . . , in this way, a keyword ciphertext as the last keyword ciphertext 975945 and an address n are stored at the last node in the DB.

A keyword encryption process in an encryption and search process considering binary search according to an embodiment of the present disclosure has been described with reference to FIG. 3, and an example of a keyword encryption process in FIG. 3 will be described with reference to FIG. 4.

Figure 4:
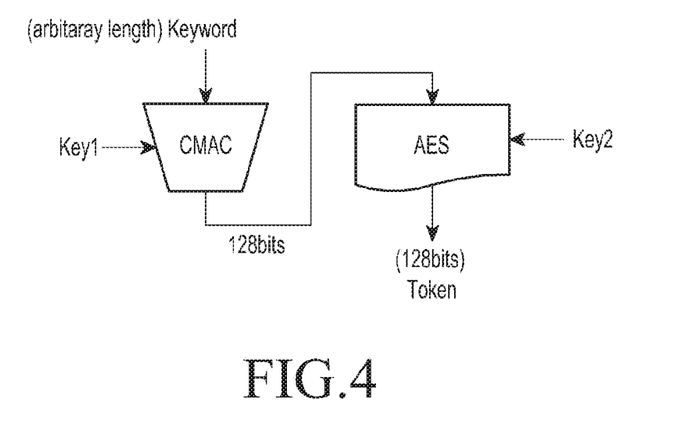
FIG. 4 schematically illustrates an example of a keyword encryption process in FIG. 3 according to an embodiment of the present disclosure.

FIG. 4 schematically illustrates an example of a keyword encryption process in FIG. 3 according to an embodiment of the present disclosure.

Referring to FIG. 4, a keyword encryption process in FIG. 4 indicates a deterministic encryption process which is applied to a keyword, and the deterministic encryption process is based on a CMAC-then-Encrypt process.

The deterministic encryption process which is based on the CMAC-then-Encrypt process inputs an arbitrary length of a keyword and calculates a 128 bit-CMAC value using a key Key 1. The CMAC value is encrypted using a key Key 2 based on an AES algorithm, so a keyword ciphertext Token is generated. Here, the keyword ciphertext Token has a 128 bit-length.

An example of a keyword encryption process in FIG. 3 has been described with reference to FIG. 4, and another example of a keyword encryption process in FIG. 3 will be described with reference to FIG. 5.

Figure 5:
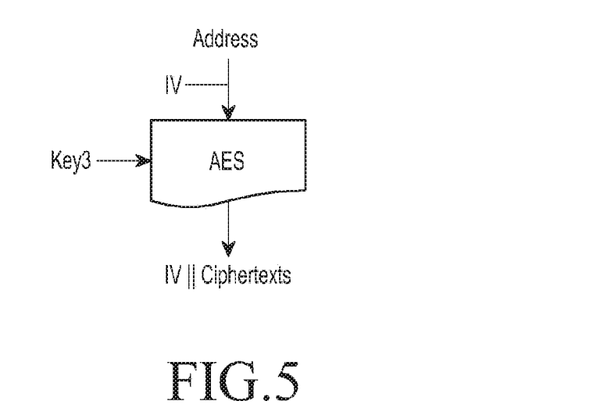
FIG. 5 schematically illustrates another example of a keyword encryption process in FIG. 3 according to an embodiment of the present disclosure.

FIG. 5 schematically illustrates another example of a keyword encryption process in FIG. 3 according to an embodiment of the present disclosure.

Referring to FIG. 5, a keyword encryption process in FIG. 5 indicates a probabilistic encryption process which is applied to an address. The probabilistic encryption process inputs an address of a file which has a constant length, and encrypts the address of the file using a key Key 3 based on an AES algorithm to output a ciphertext of the address Ciphertexts along with an initial vector value IV.

Another example of a keyword encryption process in FIG. 3 has been described with reference to FIG. 5, and a file encryption process in an encryption and search process considering binary search according to an embodiment of the present disclosure will be described with reference to FIG. 6.

Figure 6:
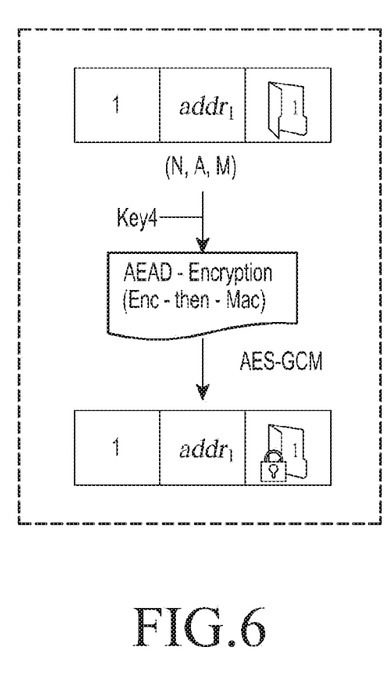
FIG. 6 schematically illustrates a file encryption process in an encryption and search process considering binary search according to an embodiment of the present disclosure.

FIG. 6 schematically illustrates a file encryption process in an encryption and search process considering binary search according to an embodiment of the present disclosure.

Referring to FIG. 6, files stored at a DB needs to be encrypted using an authenticated cryptogram which may guarantee integrity and confidentiality, so a file encryption process is applied to the files. The file encryption process is based on an AEAD encryption algorithm, and the AEAD encryption algorithm includes an encryption algorithm and a decryption algorithm. The encryption algorithm may be expressed as AEAD_Encrypt (K, N, A, M), so four input values are required. Each of the four input values K, N, A, M will be described below.

Firstly, K denotes a secret key used for file encryption. There may be various schemes for generating a secret key, and a detailed description thereof will be omitted herein.

Secondly, N denotes a nonce, and the nonce is a one-time number, and used so that the nonce is not duplicated per encryption algorithm.

Thirdly, A denotes associated data, and the associated data denotes data which is regardless of exposure such as an IP address, packet information, or/and the like.

Fourthly, M denotes a message which is actually encrypted.

A user device allocates a separate file number to each file in order to apply a file encryption process to a file stored at a DB, and a file number allocated to each file is N.

The user device allocates a value of A as a value which is regardless of exposure such as an address of a file. If it is difficult to generate a value which corresponds to the value of A, the value of A may be regarded as null. The user device may apply a value of M to a message which is actually encrypted.

Meanwhile, the user device encrypts a DB using an encryption mode as an AES-galois-counter mode (GCM) mode in a file encryption process.

A file encryption process according to an embodiment of the present disclosure will be described with reference to FIG. 6.

In a file encryption process, a file number N, an address value A, and a file M are input. Referring to FIG. 6, it will be assumed that the file number N is 1, the address value A is $addr_1$, and the file M is a file 1.

The file encryption process encrypts the file M by encrypting the input file number N, address value A, and file M, and a key Key 4 corresponding to an AES-GCM mode and stores the encrypted file M at a DB.

A file encryption process in an encryption and search process considering binary search according to an embodiment of the present disclosure has been described with reference to FIG. 6, and a search process in an encryption and search process considering binary search according to an embodiment of the present disclosure will be described with reference to FIG. 7.

Figure 7:
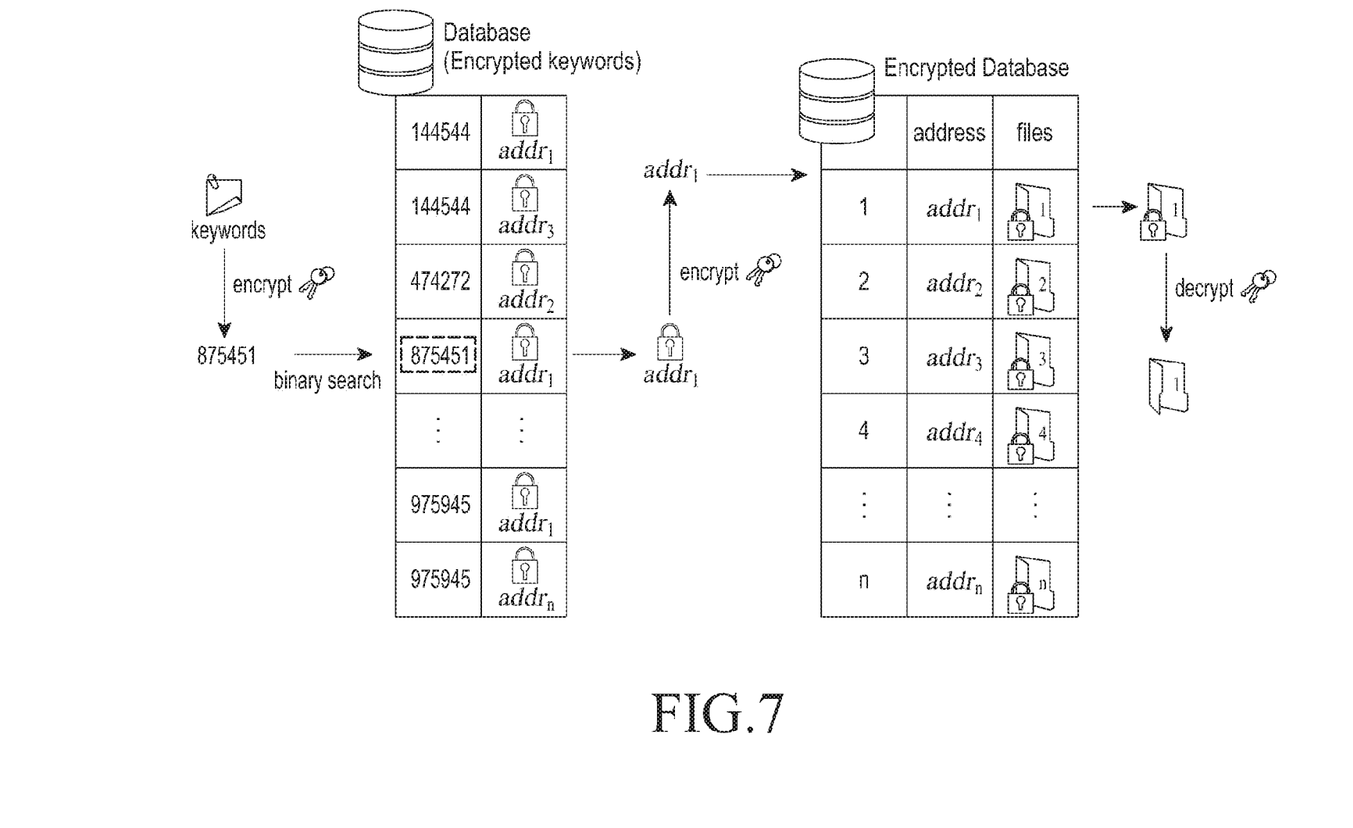
FIG. 7 schematically illustrates a search process in an encryption and search process considering binary search according to an embodiment of the present disclosure.

FIG. 7 schematically illustrates a search process in an encryption and search process considering binary search according to an embodiment of the present disclosure.

Referring to FIG. 7, a server, e.g., a cloud storage server generates a token for a keyword by encrypting the keyword by applying a deterministic encryption process upon receiving the keyword which a user device intends to search from the user device, and searches ciphertexts which correspond to an address value mapped to a token identical to the token for the keyword in a DB based on a binary search process. The server decrypts the searched ciphertexts and transmits the decrypted ciphertexts which correspond to the address to the user device.

It will be noted that a search process according to an embodiment of the present disclosure in FIG. 7 is a search process in a case that a keyword ciphertext, i.e., a token, which is generated by applying a deterministic encryption process to a keyword is 875451. That is, when a server receives a keyword form a user device, the server applies a deterministic encryption process to the received keyword thereby a keyword ciphertext which is generated according to the deterministic encryption process is 875451.

The server searches addresses which have a keyword ciphertext identical to the keyword ciphertext 875451 in a DB of the server, and detects an original address value by decrypting the searched addresses. Here, address values stored at the DB are generated by applying a probabilistic encryption process to original address values, so the server performs a decryption operation. The server decrypts a file which corresponds to the detected original address again and transmits the decrypted file to the user device.

For example, an encryption and search process considering binary search in a case that a user device and a server are implemented as separate entities and the user device stores a DB at the server is illustrated in an embodiment of the present disclosure, however, the user device and the server may be implemented in the same entity.

A search process in an encryption and search process considering binary search according to an embodiment of the present disclosure has been described with reference to FIG. 7, and a keyword encryption process and a file encryption process according to an embodiment of the present disclosure will be described with reference to FIG. 8.

Figure 8:
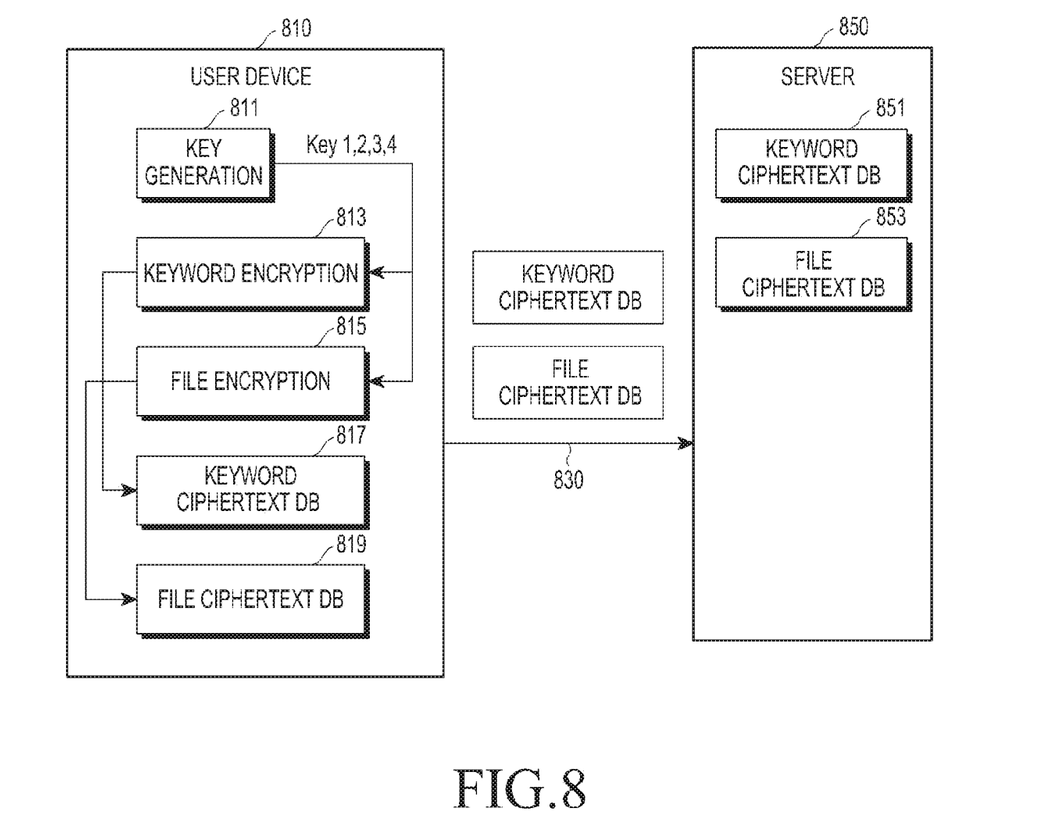
FIG. 8 schematically illustrates a keyword encryption process and a file encryption process according to an embodiment of the present disclosure.

FIG. 8 schematically illustrates a keyword encryption process and a file encryption process according to an embodiment of the present disclosure.

Referring to FIG. 8, a user device 810 generates keys used for keyword encryption and file encryption based on a keyword generation process at operation 811, this has been described above, so a detailed description thereof will be omitted herein. It will be assumed that the user device 810 generates four keys, e.g., Key 1, Key 2, Key 3, and Key 4.

If a file name, an address that a file is stored, and keywords included in the file are stored at a DB, the user device 810 generates a new table for the keywords and the address, encrypts the keywords by applying a deterministic encryption process at operation 813, and encrypts the address by applying a probabilistic encryption process at operation 815. The keyword encryption process and the file encryption process have been described above, so a detailed description thereof will be omitted herein.

The user device 810 stores a ciphertext for each of the keywords and the address at the DB. For example, the user device 810 reorders ciphertexts for the keywords in ascending order to store the reordered ciphertexts at the DB. That is, the user device 810 generates a keyword ciphertext DB at which ciphertexts for keywords and addresses are stored at operation 817.

The user device 810 generates ciphertexts for files by performing an encryption process for a file based on an authenticated encryption process, and generates a file ciphertext DB storing the ciphertexts for the files at operation 819. The user device 810 uploads the generated keyword ciphertext DB and file ciphertext DB to a server 850 at operation 830.

The server 850 stores the keyword ciphertext DB and the file ciphertext DB received from the user device 810 at operations 851 and 853, respectively.

A keyword encryption process and a file encryption process according to an embodiment of the present disclosure has been described with reference to FIG. 8, and a search process according to an embodiment of the present disclosure will be described with reference to FIG. 9.

Figure 9:
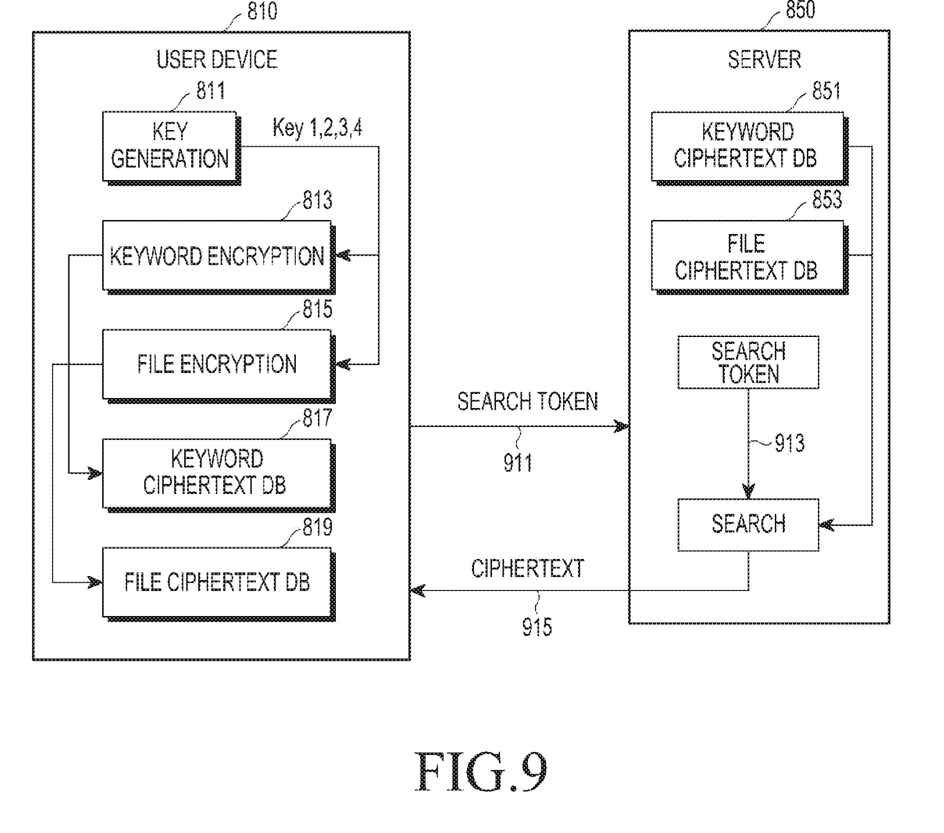
FIG. 9 schematically illustrates a search process according to an embodiment of the present disclosure.

FIG. 9 schematically illustrates a search process according to an embodiment of the present disclosure.

Referring to FIG. 9, the user device 810 generates a search token for a keyword which the user device 810 intends to search upon detecting that the keyword occurs, and transmits the search token to the server 850 at operation 911. The server 850 searches a ciphertext by performing a search process corresponding to the search token received from the user device 810 at operation 913, and transmits the searched ciphertext to the user device 810 at operation 915. The search process has been described above, so a detailed description thereof will be omitted herein.

A search process according to an embodiment of the present disclosure has been described with reference to FIG. 9, and an inner structure of a user device according to an embodiment of the present disclosure will be described with reference to FIG. 10.

Figure 10:
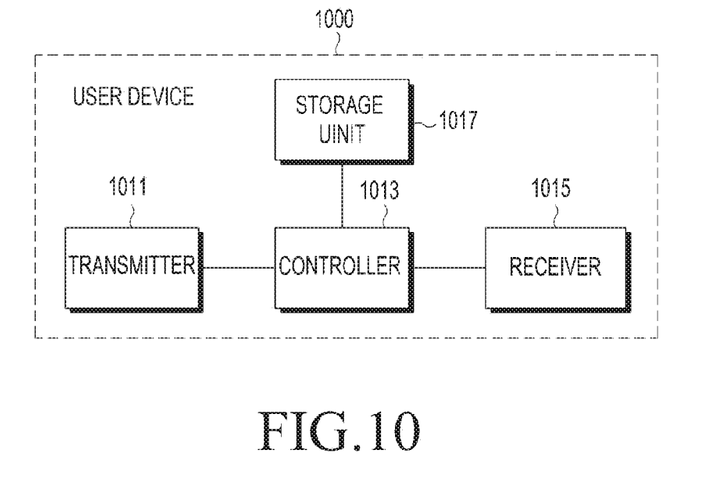
FIG. 10 schematically illustrates an inner structure of a user device according to an embodiment of the present disclosure.

FIG. 10 schematically illustrates an inner structure of a user device according to an embodiment of the present disclosure.

Referring to FIG. 10, a user device 1000 includes a transmitter 1011, a controller 1013, a receiver 1015, and a storage unit 1017.

The controller 1013 controls the overall operation of the user device 1000. More particularly, the controller 1013 controls the user device 1000 to perform an operation related to an encryption and search process considering binary search according to an embodiment of the present disclosure. The operation related to the encryption and search process considering the binary search according to an embodiment of the present disclosure is performed in the manner described with reference to FIGS. 1 to 9, and a description thereof will be omitted herein.

The transmitter 1011 transmits various signals and various messages, and the like to other devices, e.g., a server, e.g., a cloud storage server, and the like under a control of the controller 1013. The various signals, the various messages, and the like transmitted in the transmitter 1011 have been described in FIGS. 1 to 9 and a description thereof will be omitted herein.

The receiver 1015 receives various signals, various messages, and the like from other devices, e.g., a server, e.g., a cloud storage server, and the like under a control of the controller 1013. The various signals, the various messages, and the like received in the receiver 1015 have been described in FIGS. 1 to 9 and a description thereof will be omitted herein.

The storage unit 1017 stores a program related to an operation of performing an encryption and search process considering binary search according to an embodiment of the present disclosure which the user device 1000 performs under a control of the controller 1013, various data, and the like.

The storage unit 1017 stores the various signals and the various messages which the receiver 1015 receives from the server, and the like.

While the transmitter 1011, the controller 1013, the receiver 1015, and the storage unit 1017 are described in the user device 1000 as separate units, it is to be understood that this is merely for convenience of description. In other words, two or more of the transmitter 1011, the controller 1013, the receiver 1015, and the storage unit 1017 may be incorporated into a single unit.

The user device 1000 may be implemented with one processor.

An inner structure of a user device according to an embodiment of the present disclosure has been described with reference to FIG. 10, and an inner structure of a server according to an embodiment of the present disclosure will be described with reference to FIG. 11.

Figure 11:
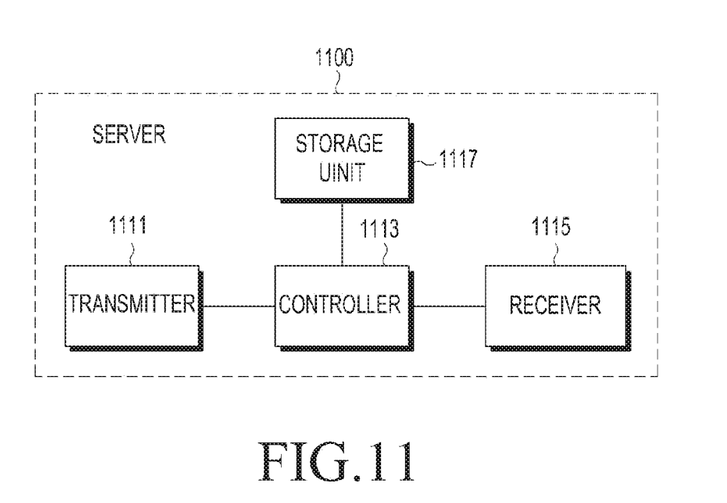
FIG. 11 schematically illustrates an inner structure of a server according to an embodiment of the present disclosure.

FIG. 11 schematically illustrates an inner structure of a server according to an embodiment of the present disclosure.

Referring to FIG. 11, a server 1100 includes a transmitter 1111, a controller 1113, a receiver 1115, and a storage unit 1117.

The controller 1113 controls the overall operation of the server 1100. More particularly, the controller 1113 controls the server 1100 to perform an operation related to an encryption and search process considering binary search according to an embodiment of the present disclosure. The operation related to the encryption and search process considering the binary search according to an embodiment of the present disclosure is performed in the manner described with reference to FIGS. 1 to 9, and a description thereof will be omitted herein.

The transmitter 1111 transmits various signals and various messages, and the like to other devices, e.g., a user device, and the like under a control of the controller 1113. The various signals, the various messages, and the like transmitted in the transmitter 1111 have been described in FIGS. 1 to 9 and a description thereof will be omitted herein.

The receiver 1115 receives various signals, various messages, and the like from other devices, e.g., a user device, and the like under a control of the controller 1113. The various signals, the various messages, and the like received in the receiver 1115 have been described in FIGS. 1 to 9 and a description thereof will be omitted herein.

The storage unit 1117 stores a program related to an operation of performing an encryption and search process considering binary search according to an embodiment of the present disclosure which the server 1100 performs under a control of the controller 1113, various data, and the like.

The storage unit 1117 stores the various signals and the various messages which the receiver 1115 receives from the user device, and the like.

While the transmitter 1111, the controller 1113, the receiver 1115, and the storage unit 1117 are described in the server 1100 as separate units, it is to be understood that this is merely for convenience of description. In other words, two or more of the transmitter 1111, the controller 1113, the receiver 1115, and the storage unit 1117 may be incorporated into a single unit.

The server 1100 may be implemented with one processor.

As is apparent from the foregoing description, an embodiment of the present disclosure enables encryption and search considering binary search.

An embodiment of the present disclosure enables encryption and search considering binary search which may be applied even if a DB is changed.

An embodiment of the present disclosure enables encryption and search considering binary search which may add and delete a keyword.

An embodiment of the present disclosure enables encryption and search considering binary search in which a length of a keyword may be unlimited.

An embodiment of the present disclosure enables to effectively search a keyword in a DB stored as a form of ciphertext thereby guaranteeing confidentiality for data and providing effective accessibility.

An embodiment of the present disclosure enables to store keyword tokens which is encrypted based on a deterministic encryption process in ascending order. Therefore, binary search in a ciphertext DB is possible, and ciphertext search may be performed so that time required for searched may be decreased.

An embodiment of the present disclosure enables to add a ciphertext to an existing DB and/or delete a ciphertext from an existing DB thereby performing encryption and search considering binary search which may be applied to a dynamic DB.

An embodiment of the present disclosure enables to generate a token based on an arbitrary length of keyword, a CMAC, and an AES thereby there is no limitation on a length of a keyword.

An embodiment of the present disclosure enables to perform an encryption process using a safe cryptological primitive which is universally used such as a CMAC, an AES, and the like thereby guaranteeing relative high safety.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disc-ROMs (CD-ROMs), magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing an encryption process, the method comprising:
   generating a plurality of keys used for keyword encryption and file encryption;
   generating an address ciphertext by performing a first encryption process on each of addresses where a plurality of files is stored;
   generating a keyword ciphertext by performing a second encryption process on each of a plurality of keywords that are included in each of the plurality of files;
   reordering the address ciphertext and the keyword ciphertext based on the keyword ciphertext; and
   storing the reordered address ciphertext and keyword ciphertext,
   wherein the first encryption process comprises a probabilistic encryption process, and
   wherein the second encryption process comprises a deterministic encryption process.

2. The method of claim 1, further comprising:
   generating file ciphertexts by performing a third encryption process on each of the plurality of files; and
   storing the generated file ciphertexts.

3. The method of claim 2, wherein the third encryption process is based on an authenticated encryption with associated data (AEAD) algorithm.

4. The method of claim 1, wherein the generating of the keyword ciphertext by performing the second encryption process on each of the plurality of keywords that are included in each of the plurality of files comprises:
   detecting a cipher-based message authentication code (CMAC) value based on each of the plurality of keywords and a first key among the plurality of keys, when the second encryption process comprises the deterministic encryption process and the deterministic encryption process is based on a CMAC-then-Encrypt process; and
   generating the keyword ciphertext by applying an advanced encryption standard (AES) algorithm to the CMAC value and a second key among the plurality of keys.

5. The method of claim 4, wherein the generating of the address ciphertext by performing the first encryption process on each of addresses where the plurality of files are stored comprises generating an address ciphertext by applying an advanced encryption standard (AES) algorithm to each of the addresses and a third key among the plurality of keys if the first encryption process is the probabilistic encryption process.

6. The method of claim 5, wherein the generating of the file ciphertexts by performing the third encryption process on each of the plurality of files comprises generating a file ciphertext for each of the plurality of files based on a fourth key among the plurality of keys, a nonce, associated data, and each of the plurality of files, when the third encryption process is based on an authenticated encryption with associated data (AEAD) algorithm.

7. An apparatus for performing an encryption process, the apparatus comprising:
   communication circuitry;
   a memory; and
   at least one processor configured to:
   generate a plurality of keys used for keyword encryption and file encryption,
   generate an address ciphertext by performing a first encryption process on each of addresses where a plurality of files is stored,
   generate a keyword ciphertext by performing a second encryption process on each of a plurality of keywords that are included in each of the plurality of files,
   reorder the address ciphertext and the keyword ciphertext based on the keyword ciphertext, and
   store the reordered address ciphertext and keyword ciphertext in the memory,
   wherein the first encryption process comprises a probabilistic encryption process, and
   wherein the second encryption process comprises a deterministic encryption process.

8. The apparatus claim 7, wherein the at least one processor is further configured to:
   generate file ciphertexts by performing a third encryption process on each of the plurality of files, and
   store the generated file ciphertexts.

9. The apparatus of claim 8, wherein the third encryption process is based on an authenticated encryption with associated data (AEAD) algorithm.

10. The apparatus of claim 7, wherein the at least one processor is further configured to:
   detect a cipher-based message authentication code (CMAC) value based on each of the plurality of keywords and a first key among the plurality of keys, when the second encryption process comprises the deterministic encryption process and the deterministic encryption process is based on a CMAC-then-Encrypt process, and
   generate the keyword ciphertext by applying an advanced encryption standard (AES) algorithm to the CMAC value and a second key among the plurality of keys.

11. The apparatus of claim 10, wherein the at least one processor is further configured to generate the address ciphertext by applying an advanced encryption standard (AES) algorithm to each of the addresses and a third key among the plurality of keys, when the first encryption process comprises the probabilistic encryption process.

12. The apparatus of claim 11, wherein the at least one processor is further configured to generate a file ciphertext for each of the plurality of files based on a fourth key among the plurality of keys, a nonce, associated data, and each of the plurality of files, when the third encryption process is based on an authenticated encryption with associated data (AEAD) algorithm.

* * * * *